United States Patent
Dareddy et al.

(10) Patent No.: US 12,208,327 B2
(45) Date of Patent: Jan. 28, 2025

(54) METHOD AND SYSTEM FOR GENERATING A RECORDING OF VIDEO GAME GAMEPLAY

(71) Applicant: Sony Interactive Entertainment Inc., Tokyo (JP)

(72) Inventors: Sashikanth Reddy Dareddy, London (GB); Hugh Alexander Dinsdale Spencer, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 138 days.

(21) Appl. No.: 16/688,091

(22) Filed: Nov. 19, 2019

(65) Prior Publication Data

US 2020/0186897 A1    Jun. 11, 2020

(30) Foreign Application Priority Data

Dec. 5, 2018 (GB) ...................... 1819865

(51) Int. Cl.
*A63F 13/497* (2014.01)
*A63F 13/335* (2014.01)
(Continued)

(52) U.S. Cl.
CPC .......... *A63F 13/497* (2014.09); *A63F 13/335* (2014.09); *A63F 13/40* (2014.09);
(Continued)

(58) Field of Classification Search
CPC ........ G06V 20/41; G06V 10/40; G06V 20/47; G06V 30/10; A63F 13/335; A63F 13/40;
(Continued)

(56) References Cited

U.S. PATENT DOCUMENTS

2009/0208181 A1    8/2009    Cottrell
2014/0328570 A1*   11/2014   Cheng ................ H04N 21/8549
                                                        386/241
(Continued)

FOREIGN PATENT DOCUMENTS

JP    2018520772 A    8/2018
WO    2017004433 A1   1/2017
(Continued)

OTHER PUBLICATIONS

Extended European Search Report for corresponding EP Application No. 19196958.3, 16 pages, dated Jun. 23, 2020.
(Continued)

*Primary Examiner* — Sunghyoun Park
(74) *Attorney, Agent, or Firm* — Kilpatrick Townsend & Stockton LLP

(57) ABSTRACT

Methods and apparatus provide for: receiving video game data generated during the playing of a video game, the video game including at least a video and corresponding audio signal; and inputting each signal in the received video game data into a respective machine learning model and determining based on the output of each model, whether a highlight event has occurred during the playing of the video game. At least some of the frames in the video and or audio signal are then selected for inclusion in a recording of the video game gameplay, based on a determination that a highlight event has occurred and a recording is generated that includes the selected video and or audio frames. A method for training the models is also provided, along with systems for training and executing the trained models.

17 Claims, 9 Drawing Sheets

(51) Int. Cl.
*A63F 13/40* (2014.01)
*A63F 13/533* (2014.01)
*A63F 13/63* (2014.01)
*A63F 13/86* (2014.01)
*G06F 18/21* (2023.01)
*G06F 18/214* (2023.01)
*G06V 20/40* (2022.01)
*H04N 21/845* (2011.01)
*H04N 21/8549* (2011.01)
*G06V 30/10* (2022.01)

(52) U.S. Cl.
CPC ............ *A63F 13/533* (2014.09); *A63F 13/63* (2014.09); *A63F 13/86* (2014.09); *G06F 18/2155* (2023.01); *G06F 18/2178* (2023.01); *G06V 20/41* (2022.01); *G06V 20/47* (2022.01); *H04N 21/8456* (2013.01); *H04N 21/8549* (2013.01); *G06V 30/10* (2022.01)

(58) Field of Classification Search
CPC ........ A63F 13/533; A63F 13/63; A63F 13/86; G06K 9/6259; G06K 9/6263; H04N 21/8456; H04N 21/8549
See application file for complete search history.

(56) References Cited

U.S. PATENT DOCUMENTS

| | | |
|---|---|---|
| 2016/0004911 A1 | 1/2016 | Cheng |
| 2016/0247328 A1* | 8/2016 | Han .................. H04N 21/8549 |
| 2017/0065889 A1 | 3/2017 | Cheng |
| 2017/0118539 A1* | 4/2017 | Lokshin ............... G11B 27/031 |
| 2017/0157512 A1* | 6/2017 | Long .................... A63F 13/497 |
| 2017/0228600 A1* | 8/2017 | Syed ..................... G06K 9/325 |
| 2018/0078862 A1* | 3/2018 | Schleicher ......... H04N 21/4781 |
| 2018/0093183 A1* | 4/2018 | Leblanc .................. A63F 13/52 |
| 2018/0174600 A1* | 6/2018 | Chaudhuri ......... H04N 21/4666 |
| 2019/0095716 A1* | 3/2019 | Shrestha .............. G08B 21/187 |

FOREIGN PATENT DOCUMENTS

| | | |
|---|---|---|
| WO | 2017066029 A1 | 4/2017 |
| WO | 2017160932 A1 | 9/2017 |
| WO | 2017218303 A1 | 12/2017 |

OTHER PUBLICATIONS

Dobrovsky Aline et al: "Deep Reinforcement Learning in Serious Games: Analysis and Design of Deep Neural Network Architectures" International Conference on Financial Cryptography and Data Security; [Lecture Notes in Computer Science; Lect.Notes Computer] 8 pages, Jan. 26, 2018.
Markus Muhling et al: "Semantic Video Analysis for Psychological Research on Violence in Computer Games" Association for Computing Machinery, 8 pages, dated Jul. 9, 2007.
Communication pursuant to Article 94(3) for corresponding EP Application No. 19196958.3, 5 pages, dated Nov. 18, 2021.
Combined Search and Examination Report for corresponding Application No. 1819865.5, 5 pages, dated May 23, 2019.
Examination Report for corresponding GB Application No. 1819865. 5, 6 pages, dated Sep. 8, 2021.
Communication pursuant to Article 94(3) for corresponding Application EP 19196958.33, 4 pages, dated Mar. 17, 2023.
Notification of Reasons for Refusal for corresponding Application JP 2019212929, 9 pages, dated Feb. 27, 2024.
The Second Office Action for correspodning CN Application No. 201911146636.6, 9 pages, dated Mar. 26, 2024.

* cited by examiner

Cut-Scene (RGB)

Game-play (RGB)

Highlight (Audio)

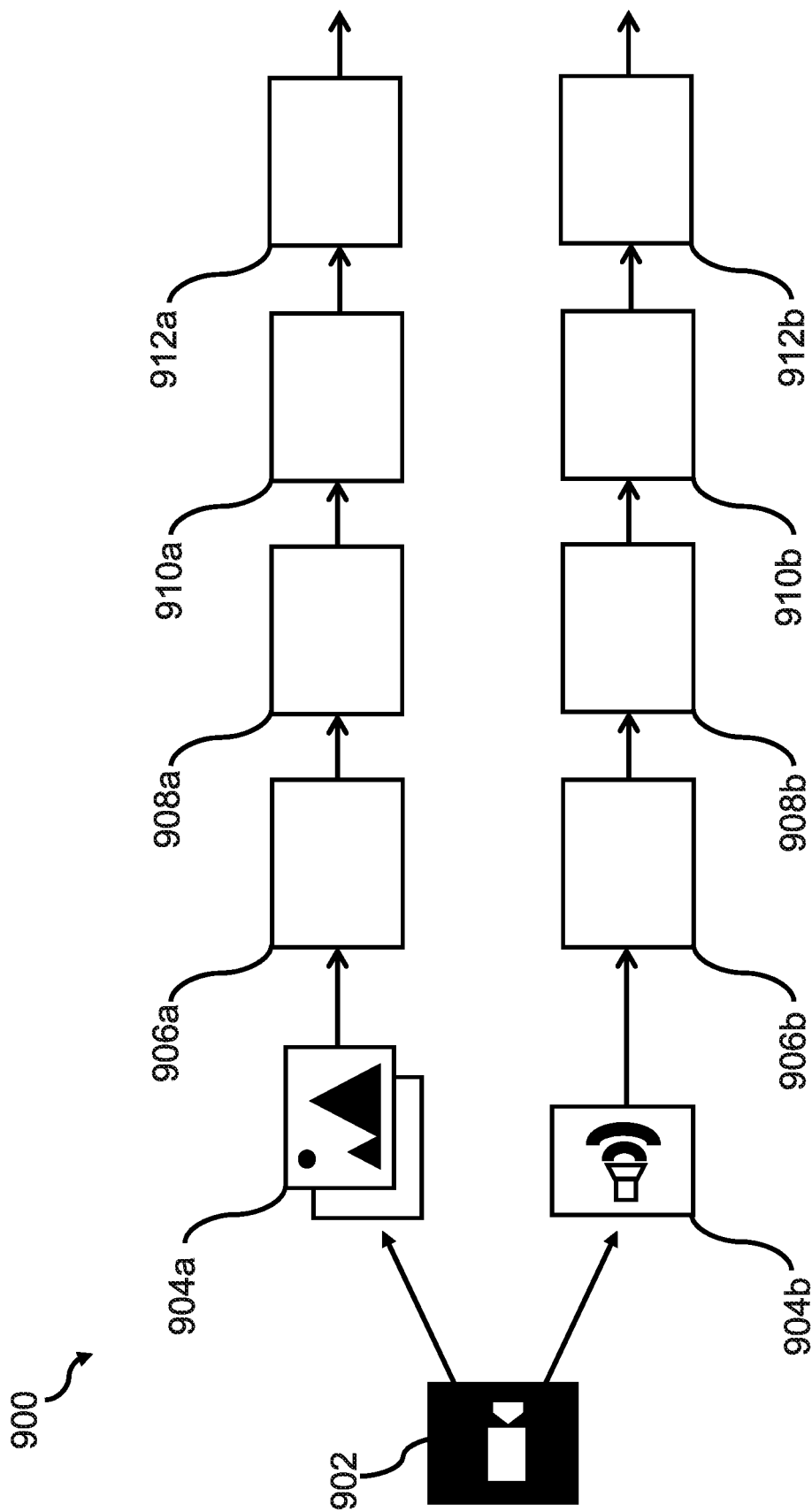

METHOD AND SYSTEM FOR GENERATING A RECORDING OF VIDEO GAME GAMEPLAY

BACKGROUND OF THE INVENTION

Field of the Invention

The present disclosure relates to a method and system for generating a recording of video game gameplay.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Many different video game consoles allow a player to capture a recording of their gameplay. Typically, this involves continuously recording gameplay over a particular interval and storing the recording in a temporary buffer. The recording may be overwritten with each successive interval, such that only the most recent e.g. fifteen minutes of gameplay are stored in the buffer. If the player provides an input, such as selecting a 'share button', then a clip that corresponds with the timing of the input is generated and stored in permanent memory.

Usually, the clip will include some of the video frames that were output before and after the input was received, to compensate for any early or delayed reaction of a user in realising that an event of interest is about to occur within the video game. The player may then have to go into video editing software, such as e.g. 'SHAREfactory™', in order to generate a clip that satisfactorily covers the event they intended to capture. As will be appreciated, capturing recordings in this way relies on a player's ability to anticipate events of interest. Moreover, capturing in-game events in this way often results in a breaking of immersion, where, for example, the user has to interrupt what they were doing in order to interact with the 'share button'.

More recently, artificial intelligence (AI) has been used to automatically generate highlight reels for eSports matches. However, the training of this AI is typically an expensive and time-consuming process. For example, for a given video game, it may take up to 6 full time employment (FTE) days for a data scientist to acquire enough labelled data for training the AI. As will be appreciated, training the AI in this way limits the ease with which the AI can be updated to accommodate new or different video game features.

Moreover, in some cases, it may not be possible to execute the trained AI locally, at the device being used to play the video game.

The present invention seeks to address or mitigate the above-identified problems.

SUMMARY OF THE INVENTION

According to one aspect disclosed herein, there is provided a method of generating a recording of video game gameplay in accordance with claim 1.

According to a further aspect disclosed herein, there is provided a system for generating a recording of video game gameplay in accordance with claim 16.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 shows schematically an example of a system for training machine learning models to identify in-game events.

DESCRIPTION OF THE EMBODIMENTS

A system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

A system that may employ the method(s) described herein may include a server or a similar or similar general-purpose computer running suitable software instructions encapsulating the method(s), and operated by a service provider to which a video game playing device owned by a user may connect, for example via a network such as the Internet. Typically the server or general-purpose computer will be responsible for collecting data from a plurality of video game playing devices and using this to train an artificial intelligence (as will be described below). Generally, this training of the artificial intelligence will be achieved using one or more graphics processing units (GPU) or tensor processing units (TPU).

Once trained, the artificial intelligence may be exported to a video game playing device. This may be provided as, for example, a software update with the trained artificial intelligence being downloaded to the video game playing device as part of the software update. Additionally or alternatively, the trained artificial intelligence may be accessed by a video game playing device via e.g. an internet connection. The artificial intelligence may correspond to a trained model, or a software module at which the trained model can be accessed.

Alternatively or in addition, the system may comprise the videogame playing device owned by the user. Alternatively or in addition, both the videogame playing device and the server may operate cooperatively to implement the method(s) or the videogame playing device may implement the method(s) locally.

The trained AI may be game specific as a result of having been trained using data generated during the playing of a specific video game. In such a case, access to the trained AI may only be permitted if a player is detected as having the video game for which the AI has been trained.

Figure 1:
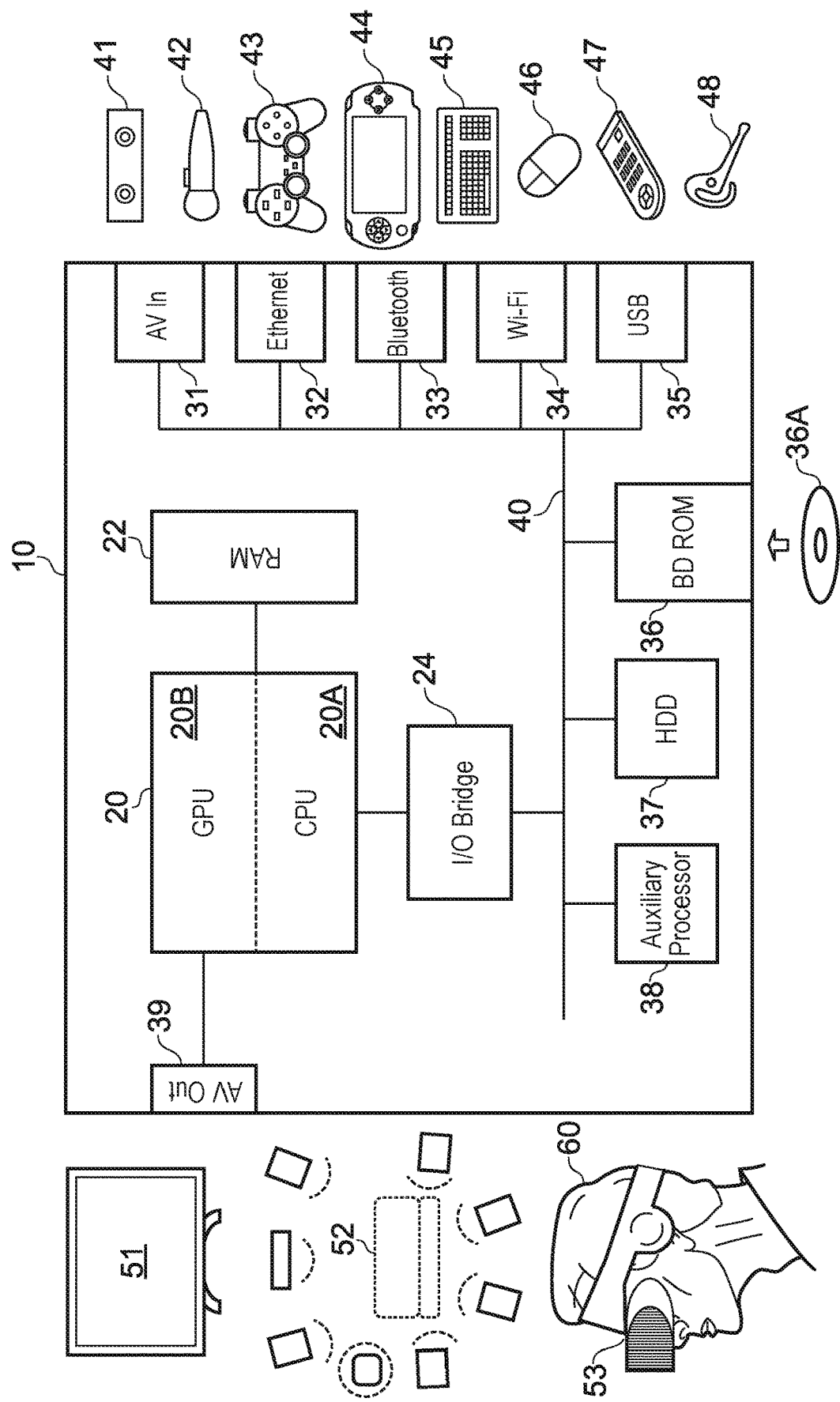
FIG. 1 shows schematically an example of a video game playing device.

Referring now to the drawings, wherein like reference numerals designate identical or corresponding parts throughout the several views, then as an example of a videogame playing device, FIG. 1 schematically illustrates the overall system architecture of a Sony® PlayStation 4® entertainment device. It will be appreciated that the device shown in FIG. 1 is just an illustrative example, and that in some embodiments, the entertainment device may include a next generation console, such as a Sony® PlayStation 5 ® device.

A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. 25 The APU 20 has access to a random access memory (RAM) unit 22.

The APU 20 communicates with a bus 40, optionally via an I/O bridge 24, which may be a discrete component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, 5 or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable 10 entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a microphone, speakers, mobile phone, printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features 25 and to select games and optionally other content.

When playing a video game playing device such as that shown in FIG. 1, a player may wish to capture moments of their gameplay, where for example, a player is performing a particularly impressive feat within the video game. This may correspond to e.g. defeating a particular enemy or multiple enemies, performing a complex fight sequence, making a difficult jump, etc. Videos including such feats are popular on video sharing platforms such as e.g. YouTube™. In some cases, a player may simply want a memento of their game playing session(s).

As mentioned previously, capturing interesting gameplay typically requires a user to interact with e.g. a 'share button' whilst playing the video game. In some cases, this means that only those moments that a player remembers to capture manually, are saved. For example, the recording of the video game gameplay may be cyclically overwritten, such that only the last 15 minutes of gameplay are stored in a temporary buffer. In some cases, the recording in the buffer may be sufficiently long to have caught the event of interest, but it may be somewhat cumbersome for the player to go back into the recording, and splice the event of interest from the rest of the recording.

Moreover, the interaction with the share button may interrupt the gameplay itself, thus interfering with the event that the player had intended to capture. For example, it may be inconvenient to press the share button during the playing of a fast-paced video game, meaning that the event of interest does not play out in the manner the player had intended.

In some video games, telemetry data may be generated and provide an indication of in-game events occurring within the video game, such as e.g. a player dying, a goal being scored, a car crashing, etc. and this data may be used to generate corresponding highlight clips. For example, in the Call of Duty® games, a player will usually be presented with a replay of their death from the perspective of the other player (or even bullet) responsible for that player dying. However, more often than not, this recording is not stored in permanent memory. Moreover, there may be a number of video games, or situations within video games, for which telemetry data is not generated. Hence, it is not always possible to capture interesting moments within gameplay, based on telemetry data.

It would therefore be desirable if interesting in-game events, corresponding to the player's gameplay, could automatically be identified and included in a highlight reel, at the end of a player's gaming session. In addition, it would be further desirable if the video game playing device could monitor or 'listen' for such events whilst the video game is being played.

Generating the Recordings of Gameplay

Figure 2:
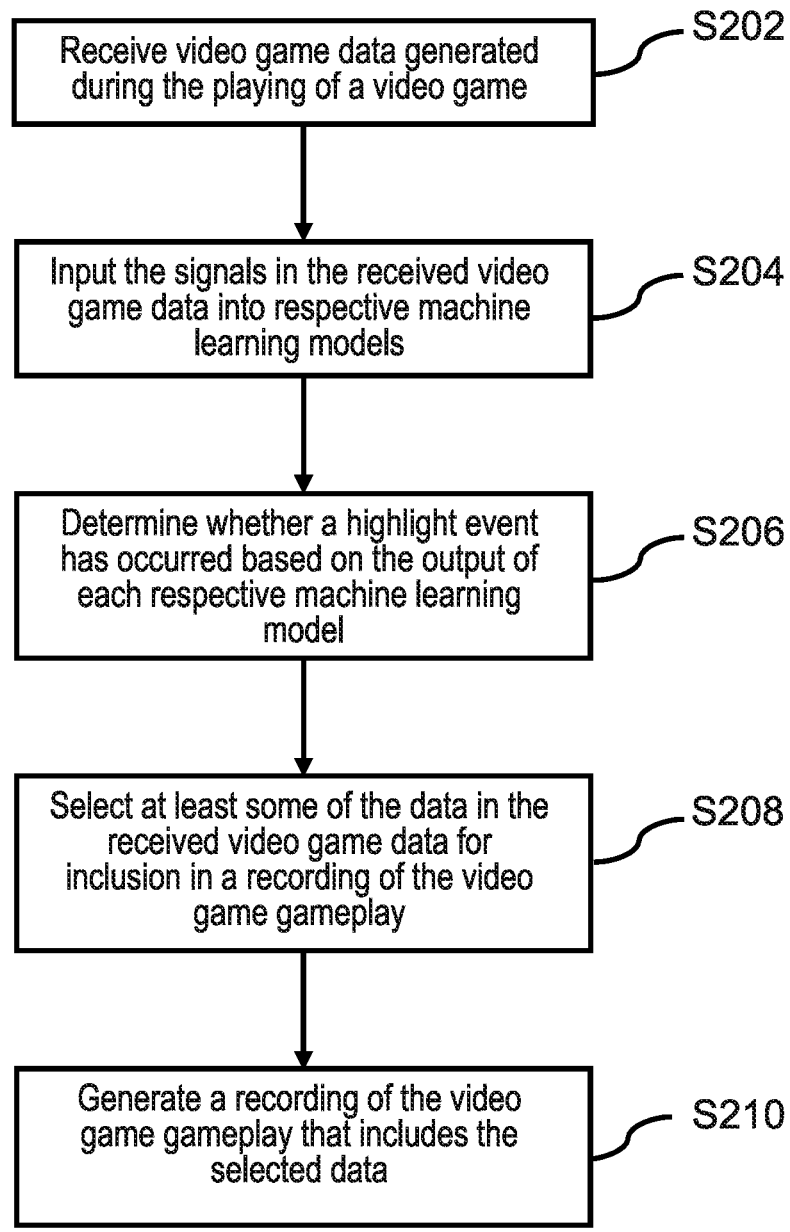
FIG. 2 shows a flowchart of a method for generating recordings of video game gameplay.

Referring now to FIG. 2, an example of a method for generating a recording of video game gameplay in accordance with the present disclosure is described. In FIG. 2, the method corresponds to a method that may be implemented whilst a video game is being played, or after a video gaming session.

At step S202, video game data generated during the playing of a video game is received. The video game data includes at least a video signal and corresponding audio signal generated by a video game playing device. In preferred examples, the video game data is received at, for example, a monitoring or listening module implemented at the video game playing device. In other examples, the video game data is transmitted to one or more servers for processing thereat (the one or more servers corresponding to e.g a computer cloud network).

The video signal may include a plurality of RGB or YUV video frames representing the visual content output during playing of the video game. The audio signal may include a plurality of audio frames, corresponding to the audio content output in synchronization with the visual content. In some examples, the audio signal may not be divided into frames and there may be a separate step of dividing the audio signal into a plurality of frames. In one example, the audio signal may be divided in 960 ms intervals, such that each audio frame is 960 ms in duration. For example, the audio may be output at a frequency of 44 kHz, down-sampled to 16 kHz, and then divided into frames such that each frame includes 15,360 samples.

In some examples, the video signal may include a video file that includes both the RGB or YUV frames and the corresponding audio (e.g. a '.wav' file). In such a case, step S202 may involve separating the audio from the RGB or YUV frames into separate respective signals. The respective video and audio frames in each signal may be stored in a temporary buffer, prior to performing the analysis described below. The temporary buffer may correspond to the ring buffer that is used to record gameplay in a video game playing device, such as the ring buffer of the PS4® or PS5® devices for example.

The video game data received at step S202 may be sampled. For example, it may be that the RGB or YUV frames and corresponding audio frames in the received signals are sampled periodically, such as at e.g. 5 frames per second. In some examples, the RGB or YUV frames may also be downsized, for example, from 1280 (width)×720 (height) pixels to 398 (width)×224 (height) pixels.

In some embodiments, the video game data may further comprise a telemetry signal indicating an in-game event. For example, in-game events such as obtaining a trophy, killing an opponent, making a headshot, dying, scoring a goal, drifting around a corner, etc. may be stored as telemetry data and received as part of the video game data. The telemetry data may include each detected in-game event and timing information indicating when the event was detected as occurring in the video game. The telemetry data may be generated by e.g. the APU, in response to the video game being executed at the video game playing device.

Alternatively or in addition, the video game data may comprise a haptic signal that includes haptic data indicating haptic feedback output at one or more devices, during the playing of the video game. The haptic feedback may have been output at one or more of the peripheral devices described previously in relation to FIG. 1. The haptic data may include an indication of the times at which vibrations were output at the peripheral device(s) and/or the magnitude of those vibrations.

Alternatively or in addition, the video game data may further comprise a motion signal that includes motion data indicating motion of the player during the playing the video game. The motion of the player may be recorded using a video camera that is connected to, or forms part of, the video game playing device. The video camera may correspond to e.g. the PlayStation Eye® mentioned previously. Additionally or alternatively, the motion signal may be generated by a motion detector at a peripheral device, such as a device that a user is holding (such as their DualShock 4® or Move® controller) or wearing (such as an HMD) and this data may be included in the video game data received at step S202.

Alternatively or in addition, the video game data may comprise a speech signal that includes speech data indicating speech (or more generally, audio) output by the player. The speech signal may be captured by one or more peripheral devices that include microphones and are in communication with the video game playing device.

The video game data may also comprise player input signals. The player input signals may include data indicating e.g. different player inputs, such as button presses that were received at a controller device, during the playing of the video game. The input signals may provide an indication of the different player inputs and the timing at which those player inputs were received.

The video game data may also comprise a video camera signal comprising a video recording of the player. The video recording may be useful in determining e.g. changes in facial expression of the player as opposed to the larger body movements that may be identified using the motion data described previously. The video recording of the player may be captured by a video camera in communication with the video game playing device, such as e.g. the PlayStation Eye™.

At step S204, at least the video signal and corresponding audio signal in the received video game data is input into a respective machine learning model. This may involve inputting at least some of the video frames in the video signal into a video machine learning model and at least some of the audio frames into an audio machine learning model.

In other examples, there may be respective machine learning models for one or more of the telemetry signals, haptic signals, motion signals, speech signals and video recording signals. For clarity, the embodiments described herein will largely focus on the training and execution of the video and audio machine learning models.

Each machine learning model is trained to identify one or more events occurring within the video game, based on the signals input to that machine learning model. The machine learning models may be trained using semi-supervised deep learning, as will be described in more detail, later. It should be noted that, for the method described in relation to FIG. 2, referring to the models as 'being trained' means that they have been trained (i.e. past tense).

It will be appreciated that, for embodiments in which the video game data includes one of more of telemetry, haptic, motion, speech, video recording data, it may not be necessary to input these into corresponding machine learning models. For example, telemetry data may be somewhat explicit in identifying an in-game event and so it may not be necessary to use machine learning for identifying the event. However, machine learning may be more useful in determining whether e.g. the timing of different button presses or motion of a peripheral device corresponds to an in-game event. Generally, there may be a respective machine learning model for each of the different signal types to which machine learning is to be applied.

In some examples, there may be a prior step (i.e. step S203) of generating feature representations of each signal in the received video game data. The feature representations may correspond to numerical representations of the data in a respective signal. Step 204 may therefore comprise inputting the feature representations of each signal into a respective machine learning model.

A feature representation of the video signal may be generated by generating a feature representation of each video frame that is to be input to the video machine learning model. The feature representations of the video frames may be generated by inputting each frame into a pre-trained model such as, for example, a Deep Residual Network (ResNet), a Densely Connected Convolutional Network (DenseNet), MobileNet, etc. More generally, the feature representations may be input to a deep learning model that is trained on generic image datasets such as images in the ImageNet database.

In one example, the Densenet201 pre-trained model is used to convert the input RGB (or YUV) video frames into a numeric vector with 1920 elements—each element corresponding to the average of the 7×12 feature maps in the penultimate layer in the DenseNet201 architecture. The vector for each RGB (or YUV) frame may then be held in memory.

Generating feature representations of the audio signal may comprise generating a feature representation of each audio frame in the audio signal. As described above, the raw audio signal may be down-sampled and divided into a plurality of frames, where each frame comprises a consecutive, non-overlapping section of audio, of a desired duration. Hence, a feature representation may be generated for each section of audio in the audio signal corresponding to a frame. In some examples, this may involve generating a spectrogram of each audio frame, such as a log-mel spectrogram. Here, a log-mel spectrogram corresponds to a log-scaled mel spectrogram.

In one example, the audio frames are 960 ms in duration and the log-mel spectrograms are generated by decomposing each frame with a short-time Fourier transform applying 25 ms windows every 10 ms. The resulting spectrogram is then integrated into 64 mel-spaced frequency bins and the magnitude of each bin is log-transformed. This gives a log-mel spectrogram having 96×64 bins. The log-mel spectrogram for each frame (having 96×64 bins) may then be averaged so as to form a 64-dimensional vector representation of the audio frame. The vector for each frame may then be held in memory.

It will be appreciated that, in some embodiments, there is no step of generating feature representations of the video and audio frames. The generation of feature representations will depend on how the video and audio machine learning models have been trained (described later, see 'training of the machine learning models'). In some embodiments, it may be that the machine learning models have been trained with video and audio frames and not necessarily the feature representations thereof.

As described previously, each machine learning model is trained to identify one or more events occurring within the video game, based on the signals input to that model (or, as the case may be, the feature representations input to that model).

The video machine learning model may be trained to identify a type of scene that each video frame (or feature representation thereof) corresponds to. For example, the video machine learning model may be trained to determine whether a given video frame corresponds to one or more of: a cut-scene, gameplay, loading screen, menu, solid colour screen (e.g. death), other, etc. The granularity with which the machine learning model can determine different scene-types will ultimately depend on the training. In some examples, the video machine learning model may be trained to identify scene-types as corresponding to different types of gameplay, e.g. combat, walking, idle, etc.

The video machine learning model may comprise a neural network, such as, for example, a convolutional or recurrent neural network (RNN, or CNN). However, any suitable machine learning system may be considered.

The audio machine learning model may have been trained to identify an audio event that each audio frame (or corresponding feature representation) input to the model, corresponds to. In one example, the audio machine learning model is trained to determine whether an audio frame corresponds to a 'highlight' or 'non-highlight' audio event. Whether an audio event is determined as corresponding to a 'highlight' or 'non-highlight' event will depend on how the audio machine learning model is trained, as will be described later. An example of an audio 'highlight' event may include e.g. the sound of a weapon being used, whereas a 'non-highlight' audio event may correspond to e.g. a city or nature sounds that may be present in the video game. In some examples, the audio machine learning model may be trained to detect audio events with a finer granularity, e.g. distinguishing between different types of highlight audio events.

In some examples, the audio machine learning model may comprise a logistic regression model. In other examples, the audio machine learning model may comprise a binary classification algorithm such as a Gradient Boosting Trees, Random Forests, Support Vector Machine, etc. However, any suitable machine learning system may be considered.

In preferred examples, each trained machine learning model is executed locally at the video game playing device being used to play the video game.

At step S206, it is determined whether a highlight event has occurred based on the output of each machine learning model. This determination may be based, for example, on the type of scene identified by the video machine learning model and the type of audio event identified by the audio machine learning model. In some examples, it may be determined that a highlight event has occurred if the scene-type is identified as corresponding to 'gameplay' and the audio corresponds to a 'highlight' audio event. Detecting highlight events in this way means that, for example, the firing of e.g. a gun in a cut-scene is not identified as corresponding to a highlight event stemming from gameplay.

Figure 3:
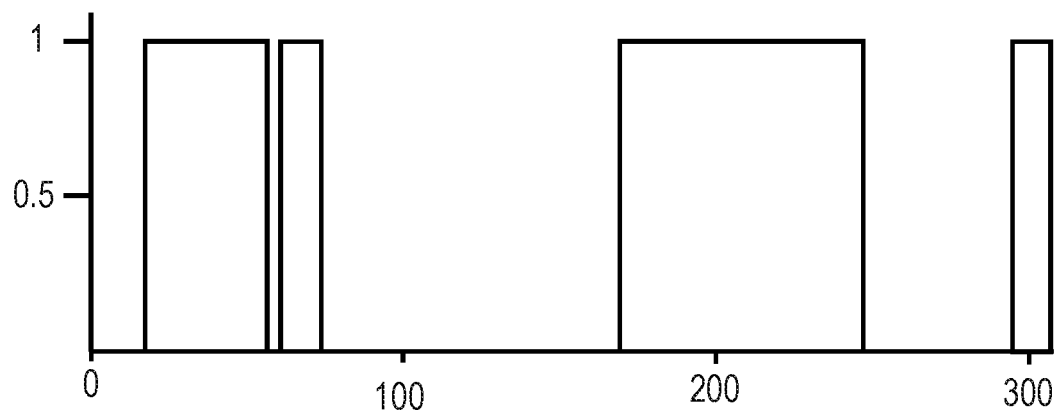
FIG. 3 shows an example of different scene-types that may be identified by a trained video machine learning model and highlight events that may be identified by a trained audio machine learning model.
Figure 3:
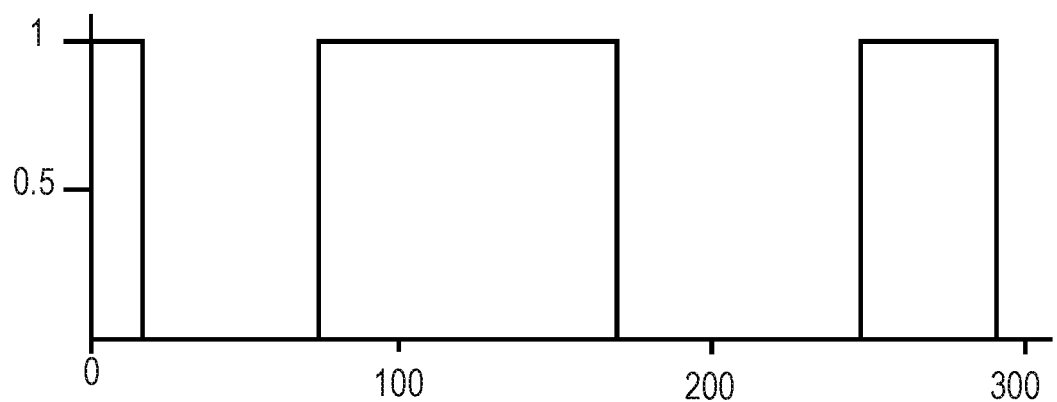
Figure 3:
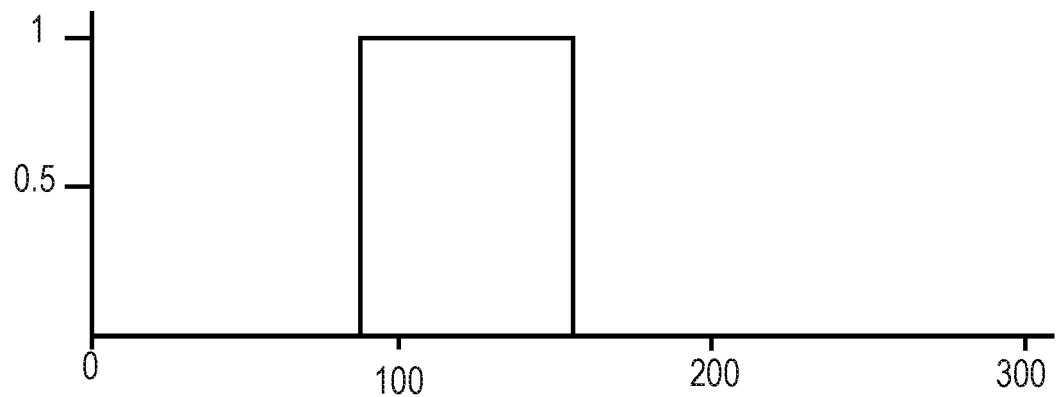
Figure 4:
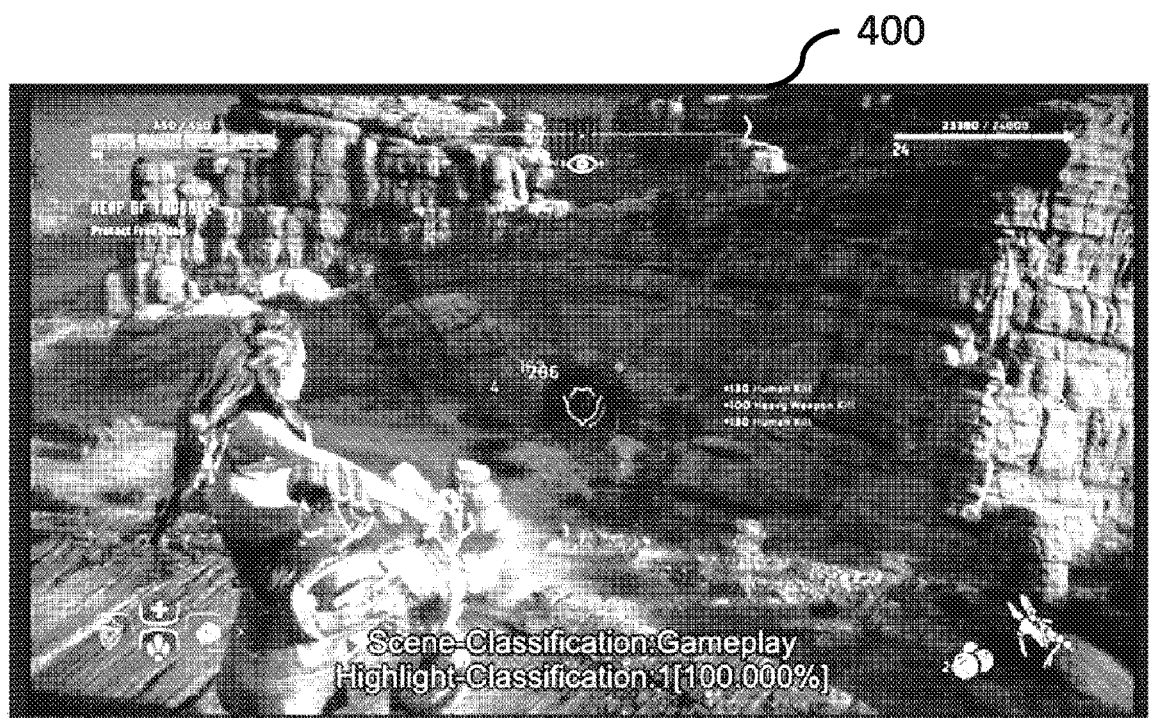
FIG. 4 shows an example of a video frame that may be selected for inclusion in a highlight reel.

An example of this is shown is schematically in FIG. 3, which shows the output of the video machine learning model and audio machine learning model over a plurality of frames (in this case, around 305 frames). The top two charts show the probability determined by the video machine learning that the RGB frames correspond to a cut-scene and gameplay (i.e. the player controlling their character in a virtual environment). A probability of '1' corresponds to a detection of an event. As can be seen in FIG. 4, gameplay has been detected as occurring between frames 75-160 and 250-290. The video machine learning model has also detected cut-scenes as occurring between frames e.g. 20-60, 65-70 and 290-305. In the bottom-most chart, it can be seen that the audio machine learning model has detected a highlight audio event between frames 85 and 155. As a result of this, it may be determined that a highlight event within the video game has occurred between frames 85 and 155.

FIG. 4 shows an example of a video frame 400 that has been identified as corresponding to a highlight event. In FIG. 4, the frame 400 is an RGB frame taken from the video game Horizon Zero Dawn™, and shows the protagonist, Aloy, firing a gun at an enemy. In this example, the video machine learning model has identified the RGB frame as corresponding to 'gameplay' and the audio of the gun being fired (or prepared for firing) as corresponding to a highlight audio event, as indicated by the 'scene-classification' and 'highlight-classification'.

In some cases, the determination of whether a highlight event has occurred may depend on the type of gameplay (e.g. combat) that is identified by the video machine learning model and the type of audio detected by the audio machine learning model. This may ensure, for example, that the video frames in which a player is blindly shooting into empty landscape are not identified as corresponding to a highlight event, despite the corresponding audio indicating that a highlight event may be occurring.

Returning to FIG. 2, the method comprises a further step S208 of selecting at least some of the frames in the video and or audio signals (received in the video game data) for inclusion in a recording of the video game gameplay. In some examples, both video and audio frames may be selected for inclusion in the recording (i.e. the recording may be a video file). The video and or audio frames may be selected so as to correspond to the frames for which a highlight event was detected. In some cases, this may involve selecting at least some of the frames that occurred before and after the detected highlight event, to ensure that the highlight is shown in context and to compensate for any in the highlight event detection. As will be appreciated, it may be necessary to determine the duration over which a given detected highlight event is detected as occurring, to ensure that recording does not include highlight events occurring over excessively long or short time periods.

In some examples, at least some of the data in one or more of the telemetry signal, motion signal, speech signal, player input signal and video camera signal may be selected for inclusion in the recording, along with the selected video and or audio frames. For example, the player's speech may also be included in the recording, along with the video recording of the player reacting whilst playing the video game.

At step S210, a recording of the video game gameplay that includes the selected video and or audio frames is generated. The recording may be generated in the form of a video file and stored in electronic storage at for example, the video game playing device, or at a remote server. Alternatively, the recording may be generated at one or more servers, and transmitted to the video game playing device (so long as a connection between the video game playing device and the one or more servers exists or has been restored).

The recording may include a plurality of different highlight events detected during gameplay, so as to form a highlight reel. Each highlight event may include a corresponding highlight clip that includes the video and audio that is identified as corresponding to the highlight event. Generally, each highlight video clip will include a plurality of contiguous video and audio frames.

The method may further comprise displaying the recording of the video game gameplay at a display device. For example, the video game playing device may include, or be connected to, a display device. The recording may displayed automatically, in response to a player having terminated a gaming session, or may be displayed in response to a user having selected the recording from a menu. For example, the PS4™ or PS5™ may have an associated home screen menu, from which recordings can be accessed via the 'Capture Gallery' tab.

In some examples, the method may comprise displaying or outputting at least some of the data in one or more of the telemetry signal, motion signal, speech signal, player input signal, video camera signal that corresponds with the selected video and or audio frames. For example, the method may comprise displaying the video of the real player, in addition to the video of the video game gameplay. This video may be displayed in a small window that is superimposed over the video of the video game gameplay, for example. In additional or alternative examples, telemetry data indicating an in-game event that corresponds with the selected video frames may be displayed. This may involve, for example, super-imposing text, such as 'HEADSHOT!' over the corresponding video frames that include that event.

In some examples, the recording of the video game gameplay may be transmitted from the video game playing device to a mobile device that is in communication with the video game playing device. For example, the video game playing device may be configured to detect that the game application running at the video game device has been closed, and in response thereto, transmit the recording to the mobile communication device.

The time taken to generate the recording will depend on the number of highlight events detected and the size of the recording that is to be generated. Hence, in some situations it may not be possible to present the recording to the player, as soon as the player has finished their gaming session (i.e. where the recording is relatively large). Hence, in some embodiments, the method may comprise a step of generating a message for display, indicating that the recording is ready for playback. If, for example, the recording is generated via the cloud, then it may be possible for a user to receive a message through an app on their phone (such as e.g. the PS App™), informing them that the recording is ready for playback. The message may include (i.e. have embedded), or provide a link to, the corresponding recording. As a result of this, it may be that the player is not presented with the recording until their next video gaming session.

Alternatively, it may be that the recording is generated by the video game playing device, in the background, whilst the player interacts with other content. In such cases, the message may be presented to the player as a notification, in a similar manner in which players are informed that e.g. software updates are available.

In preferred embodiments, the recording is made available to the player at the end of their video game playing session.

The recordings may be generated on a per video game session basis—i.e. as a summary of the highlight events occurring within each individual video game session. A video game session may correspond to a continuous playing of the video game (i.e. duration for which the video game application is not closed), or a specific event within the video game, such as e.g. a match, a race, or other timed event. The player may be playing the video game offline (as in, not with other online players) or online (i.e. with other online players).

Alternatively or in addition, the recordings may be generated over multiple video game sessions. For example, in single player games, it may be desirable to generate a recording of the highlight events that were detected, over a player's completion of e.g. a story mode. In such a case, the recording may correspond to a summary of the player's highlights at different points within the story. This recording may be presented to the user after they have completed the story mode, for example, along with the end credits. In other examples, it may be desirable to generate a recording of the player's highlight events across different games in e.g. a competitive tournament.

In some embodiments, the method comprises determining the duration of the generated recording. For example, it may not be desirable to present the recording to the player, if that recording is more than or less than a threshold duration. The player may be notified that the recording is ready for playback, in response to the duration of the recording being determined as being within an acceptable range of a threshold duration.

If the recording is to correspond to a summary of the player's progress over a prolonged period then it may be necessary to determine the player's progress before presenting the recording to the player. For example, it may be necessary to determine whether the player has completed a sufficient number of missions, games, tasks, matches, etc. before the recording is to be stored as a final version. Once a final version has been generated, a message indicating that the recording is ready for playback may be presented to the player.

In some embodiments, there may be a plurality of different highlight events that can be detected based on the output of each machine learning model. The method may further comprise selecting an order for playing back the video and or audio frames selected at step S208 based on the highlight event each selected frame corresponds to and a pre-determined order for playing back different highlight events.

The pre-determined order may correspond to a narrative arc that defines an order in which different highlight events are to be played back in the recording. The pre-determined order may correspond to the chronological order in which the highlight events occurred, but may also follow a structure that shows the player slowly improving at the video game. For example, the pre-determined order may define relative locations within the recording in which video of e.g. a player's character dying or losing, and video of a player successfully defeating an opponent, are to be positioned.

In some embodiments, the method comprises receiving historical data generated during the playing of the video game by one or more other players. The historical data may include statistical data indicating how other players have compared when playing the same video game. The other players may include, for example, players that are known to the current player, such as the friends on the current player's friend list.

A correspondence between at least some of the received historical data and selected video and or audio frames may then be determined. That is, historical data that is relevant to the selected video and or audio frames may be identified, and this relevant information may be displayed when playing back the recording of the video game. For example, if the video frames are of the player's avatar fighting and defeating a particular enemy or opponent within the video game, the player may be able to view stats indicating how other players have fared against the same opponent. This may include, for example, '80% of all players died at least once when facing this enemy' or 'your friend, JimBob86 died 8 times when facing this opponent'. In some examples, the historical data may include recordings of the player's friends at the same point in the video game, and the player may be able to view the recording for a given frame, alongside the recording generated for the current player.

Figure 5:
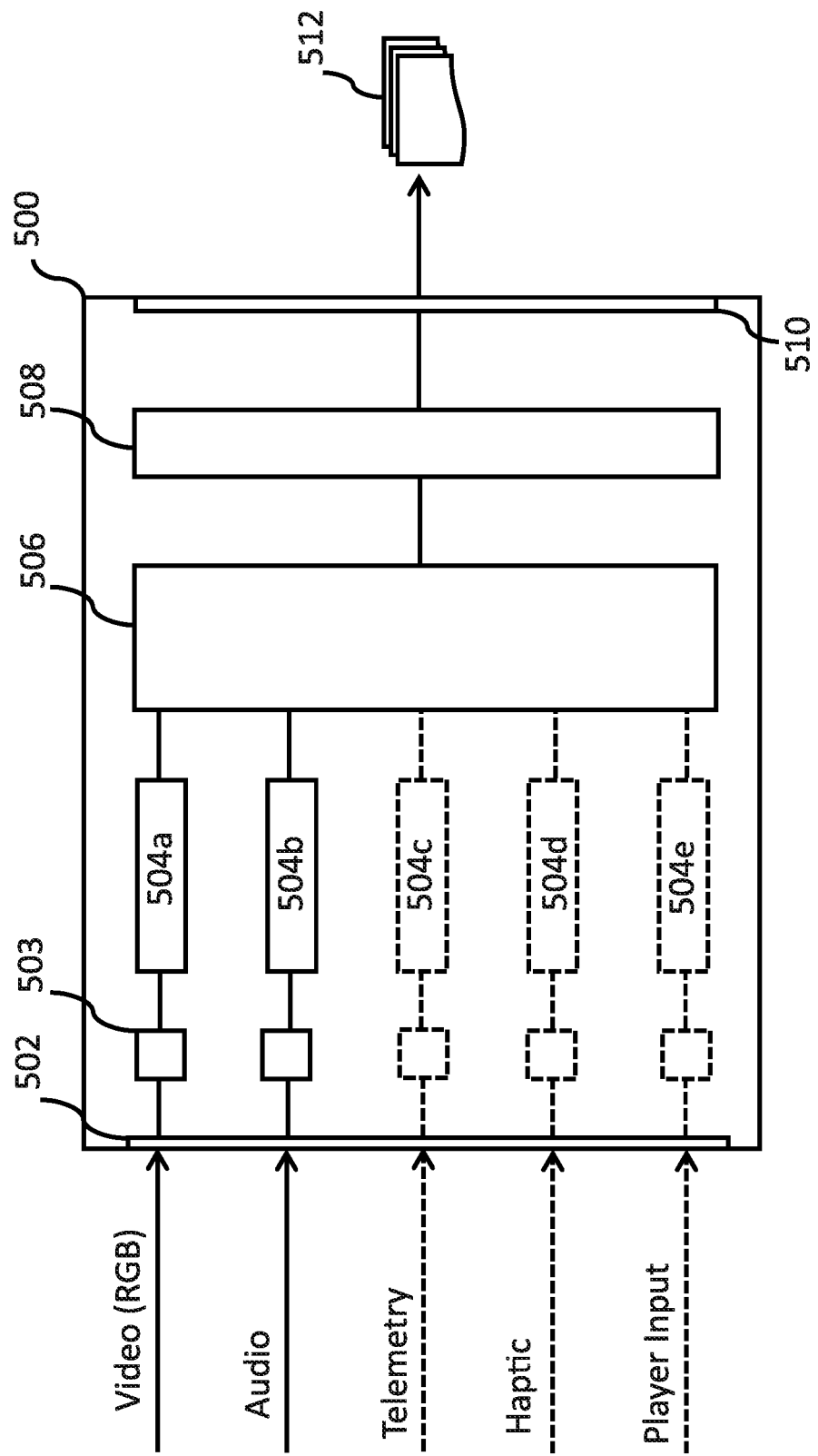
FIG. 5 shows an example of a listening unit for detecting highlight events in video game gameplay.
Figure 6:
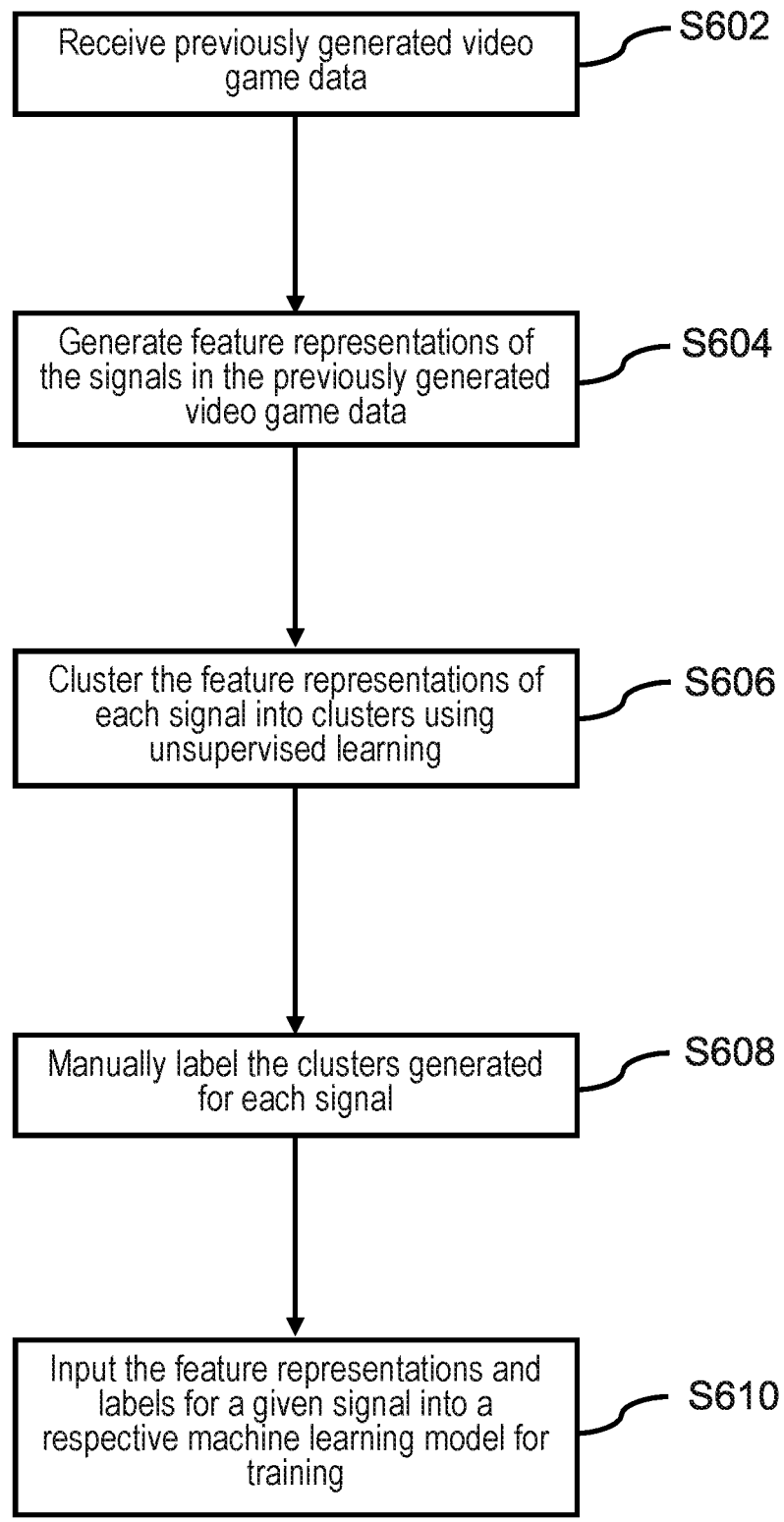
FIG. 6 shows an example of a method for training a machine learning model to detect highlight events within video games.

FIG. 5 shows schematically an example of a high-level system for implementing the trained machine learning models. The high-level system includes a listening unit 500 configured to detect (i.e. monitor for or 'listen for') highlight events occurring within video game gameplay. The listening unit 500 may be implemented locally as software installed at a video game playing device, such as a games console, personal computer, mobile device, etc. Alternatively, the listening unit 500 may be implemented at one or more servers (such as a cloud network), with the video, audio and any other video game data being obtained by the video game playing device and being passed on to the one or more servers. In such a case, the listening unit 500 may be configured to transmit its output to the video game playing device from which video game data was received. A specific example of the system will be described later, in relation to FIG. 6.

The listening unit 500 comprises a receiving unit 502 configured to receive video game data generated during the playing of a video game. The video game data includes at least a video signal and corresponding audio signal. The video and audio signals may be in any of the forms described previously in relation to FIG. 2.

The receiving unit 502 may include a video buffer, such as a ring buffer, that enables video (e.g RGB, YUV) and corresponding audio frames to be sampled.

In some embodiments, the video game data may further comprise one or more of a telemetry signal indicating an in-game event, a haptic signal indicating haptic feedback output at one or more devices being used to play the video game and a player input signal indicating an input received by the player, whilst playing the video game. The player input signal may provide an indication of e.g. button presses made by the player, movement of the player, speech output by the player, changes in the player's facial expression or pose, etc. For brevity, FIG. 5 shows a single player input signal, but it will be appreciated that there may be separate respective signals for each of these types of data, as described previously in relation to FIG. 2.

The listening unit 500 further comprises a plurality of modules 504a, 504b, 504c, 504d, 504e, with each module being configured to receive a different one of the signals in the video game data. That is, each module is configured to receive a different type of signal (e.g. video or audio, etc.) in the received video game data. In FIG. 5, the video and audio signals and the corresponding modules are shown in bold, to indicate that these modules are not optional. The other signals in the received video game data and the corresponding modules are shown with dashed lines to show that these are optional.

Each module is configured to determine an event occurring within the video game, based on the signals input to that module. For example, a first module 504a may be configured to detect events occurring within the video game, based on the video frames input to that module 504a. A second module 504b may be configured to detect events occurring within the video game, based on the audio frames input to that learning module 504b. The first module 504a may be trained to classify the video frames into different scene-types; the second module 504b may be trained to classify the audio frames into 'highlight' or 'non-highlight' audio events. The classification performed by the first and second modules 504a, 504b may be performed using any of the methods described previously in relation to FIG. 2.

The other modules 504c, 504d, 504e, where present, may be configured to identify in-game events based on e.g. the received telemetry data, haptic data and player input data. As described above, it may be that machine learning is only applied to some of this data. For example, deterministic rules may be used for the telemetry data and/or haptic data, but machine learning used for the player input data. It may therefore be that not all of the modules 504*c*, 504*d* and/or 504*e* use machine learning to identify in-game events, based on the input signal. However, machine learning is used by the first and second modules 504*a*, 504*b* for performing the classification.

The first and second modules are trained using semi-supervised learning so as to determine a relationship between the signals input to that model and corresponding events, as will be described in more detail, later. In some examples, one of more of the third, fourth and fifth modules 504*c*, 504*d*, 504*e* are trained in this way.

The output of each module is received at a highlight detector 506. The highlight detector 506 is configured to detect, based on the events detected by each module, the occurrence of highlight events within the video game. The highlight detector 506 may also be configured to detect the absence of highlight events.

In some examples, the highlight detector 506 may be configured to detect a highlight event based on the scene-type identified by the first module 504*a*, and the audio event detected by the second module 504*b*. For example, if a scene-type is identified as corresponding to e.g. 'combat', and the audio detected as corresponding to a 'highlight event' then the video and corresponding audio frames may be identified as corresponding to a highlight event in the video game.

As will be appreciated, the accuracy with which the highlight detector 506 detects highlights may be improved by including further modules. For example, an event may be detected as corresponding to a highlight event based on the output of three or more modules. This may compensate for any inaccuracy in the outputs of any one of individual modules. For example, if the video, audio, and haptic and/or telemetry and/or player input data all indicate that an interesting in-game event occurred then it may be determined with high confidence that a highlight event did actually occur.

It will be appreciated that, in some examples, it may not be necessary to input telemetry data into module 504*c*. For example, the telemetry data may be somewhat explicit in indicating an in-game event (e.g. 'headshot', 'player death', etc.) and this may also be used directly by the highlight detector 506 when determining whether a highlight event has occurred during gameplay. For example, it may be determined with a high confidence that a highlight event occurred if this is indicated by all three of the video, audio and telemetry data.

The listening unit 500 further comprises a recording unit 508 configured to generate a recording of the video game gameplay, based on the output of the highlight detector 506. For example, in response to receiving an indication of a detected highlight, the recording unit 508 may be configured to generate a recording that includes the video and or audio frames corresponding to the detected highlight event. The recording may include a video file that includes both the selected video and corresponding audio. The recording may be stored in memory (not shown), prior being output via an output unit 510. The recording may be output in the form of a highlight reel, comprising video clips corresponding to the different highlight events detected during playing of the video. For example, the system may include a display device (not shown) at which the generated recording is to be output. In some embodiments, the recording may be output at e.g. a mobile device that is in communication with the listening unit 500, as described previously in relation to FIG. 2.

In some embodiments, the listening unit 500 may be configured to include at least some of the data received in at least one of the telemetry or player input signals, in the recording of video game gameplay. This may include e.g. video of the player (rather than their avatar), the player's speech, buttons pressed by the player, an in-game event indicated via the telemetry data, etc. This data may also be output as part of the recording, as described previously.

In some embodiments, the listening unit 500 comprises a plurality of feature extractors 503, wherein each feature extractor is configured to receive a different signal in the received video game data and to generate feature representations of the data frames in that signal. A first feature extractor may be configured to receive video frames and a second feature extractor may be configured to receive audio frames. The first and second feature extractors may be configured to generate feature representations in the manners described previously, in relation to FIG. 2. The feature representations generated by each feature extractor may be input to a corresponding machine learning model. For example, the first and second feature extractors may be configured to receive feature representations of video and audio frames respectively. An example of a specific implementation of the system shown in FIG. 5 will be described later, in relation to FIG. 9.

It will be appreciated that in some embodiments, there may be no feature extractors. This may be the case, for example, if the first and second modules 504*a*, 504*b* have been trained with the video and audio frames and not with feature representations thereof, as will be described further below.

Training the Machine Learning Models

The use of AI for generating highlight reels from video game footage is known. However, in known methods, the AI is typically trained using supervised learning only. Training the AI in this way requires a developer or data scientist to manually tag video frames from tens of hours of video game footage with corresponding labels indicating whether those frames correspond to a highlight event or not, in order to generate a sufficient amount of training data for training the AI. It has been found by the inventors, for example, that the manual tagging of 15 hours of game video for the game Horizon Zero Dawn™ (corresponding to approximately 300,000 frames) took nearly 6 FTE days to complete. Clearly generating training data in this manner is undesirable and means that the AI is not easily portable to other video games.

In the present disclosure, this problem is overcome by training each machine learning model with previously generated video game data, and using semi-supervised deep learning to determine a relationship between the signals in the previously generated video game data and one or more corresponding events. A method for training the machine learning models using semi-supervised learning will now be described in relation to FIG. 6.

At step S602, previously generated video game data is received. The previously generated video game data may comprise at least video and audio signals generated during previous playing of the video game. In some examples, this data may be obtained from a video sharing platform such as YouTube™. The previously generated video game data will generally be specific to a particular video game. For example, the machine learning models may be trained for a particular video game and (once trained) made available to players that are detected as having that video game. As will be appreciated, it may be necessary to re-train the models if additional content is released for, or in relation to that game, such as downloadable content (DLC), prequels, sequels, etc.

The previously generated video game data may be generated by multiple different players and provide representative coverage of the whole video game or different events that may occur within the video game. For some games, it may be possible to collect as few as 2-5 videos, so long as those videos cover a sufficient extent of the possible gameplay. This may be possible, for example, using videos for Horizon Zero Dawn™, if each video covers a majority of the main story.

The previously generated video game data may also include one or more of telemetry signals, haptic signals, motion signals, speech signals, player input signals, video camera signals generated during previous playing of the video game. In preferred examples, the previously generated audio signals do not include any player voice over—i.e. this is received in a separate speech signal, or not at all. If the audio signals include both game audio and player speech, it may be difficult to train the audio machine learning model. In some examples, the video and audio may be received together as a video file and need to be separated into different respective signals. As before the audio signals may need to be divided into 960 ms segments (i.e. frames).

At step 604, the method comprises generating feature representations of the signals in the previously generated video game data.

In some examples, generating the feature representations of the previously generated video signals may involve inputting at least some of the RGB or YUV video frames in the previously generated video signal into a pre-trained model, such as e.g. DenseNet, ResNet, MobileNet, etc.

Generating feature representations of the previously generated audio signals may involve generating a log-mel spectrogram of at least some of the audio frames in the previously generated audio signal. Each spectrogram may correspond to a 960 ms audio frame and the method may comprise generating a 64-dimensional feature representation of each spectrogram by taking the mean across the 64 frequency bands for that spectrogram (ranging from 125 Hz to 7000 Hz). This may correspond to the feature representation generation described previously, in relation to FIG. 2.

At step S606, the feature representations generated for each signal are clustered into respective clusters using unsupervised learning. Each cluster corresponds to content (for a given signals) that has been identified as being similar in some with respect with other content in that cluster.

In some examples, this involves using k-means clustering or mini batch k-means clustering to sort the feature representations generated for each signal into respective clusters. It has been found by the inventors that either of k-means and mini-batch k-means clustering is particularly well suited to clustering video game data. In most video games, the different types of visual and audio events that may occur are structured and repetitive in nature, and so can be distinguished from one another to a relatively high degree of accuracy. For example, it may be that in a shooting game, explosions from e.g. grenades or bombs look substantially similar in terms of colour, size, etc. and so these can easily be identified as being separate from a player aiming a weapon. Even in the latter case, it may be that the appearance of the player's avatar looks substantially similar when aiming the weapon, despite the target being different, and so this may identified as a different cluster.

In some embodiments, mini-batch k-means clustering is used to sort the feature representations of the video frames into 64 different groups (i.e. where k=64). The RGB or YUV video frames may be input to an RGB-scaler model to standardise the video data to have a zero mean and unit standard deviation before, the mini-batch k-means clustering is applied to the video data. In the same or different embodiments, mini-batch k-means clustering is used to sort the feature representations of the audio frames into 32 different groups (i.e. k=32). Similarly, the audio frames may be input to an audio-scaler model to standardise the input data to having zero mean and unit standard deviation before the mini-batch k-means is applied to the audio data.

It will be appreciated that a different value of k may be used in the k-means or mini-batch k-means, depending on the level of granularity that is desired for detecting different events (corresponding to different clusters) within the signals of the previously generated video game data.

Figure 7:
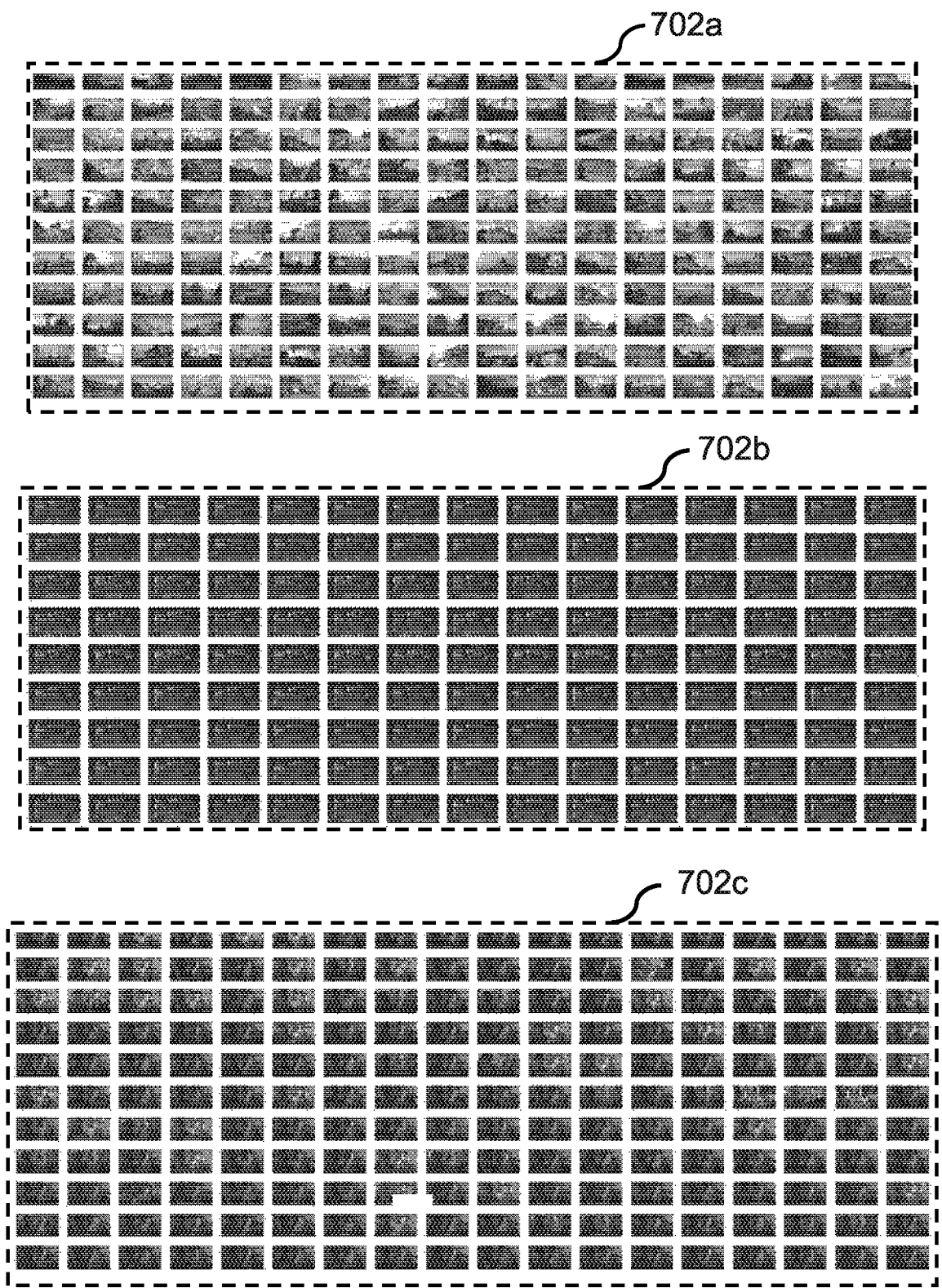
FIG. 7 shows an example of RGB frames in each of a plurality of different clusters.

FIG. 7 shows an example of some of the different clusters that were identified using mini-batch k-means clustering to sort 15 hours of video game footage (RGB frames) from the game Horizon Zero Dawn™. The first cluster 702a corresponds to the character Aloy, aiming at a target, be that during e.g. combat or for the purposes of hunting. The second cluster 702b corresponds to the player opening the "Quests" tab in the menu settings. The third cluster 702c corresponds to a cut-scene. It will be appreciated that these are just some examples of the RGB frames that may be identified as belonging to different clusters. In some examples, it may be that multiple clusters relate to the same type of event. For example, it may be that there are multiple clusters corresponding to 'gameplay' (i.e. where the player is navigating the open world), with each cluster corresponding to a particular type of environment—e.g. frozen/snow covered lands, desert, dark 'Coldrons', etc. It may also be that there are multiple different clusters for each type of menu screen. For example, a cluster for each of "Quests", "Inventory", "Map", etc.

In some embodiments, the training method comprises a step of filtering at least some of the feature representations from each cluster. This may involve removing feature representations from a respective cluster that exceed a threshold distance from the centroid of that cluster.

For example, the top 10% of RGB or YUV frames closest to a respective cluster centroid may be selected as being representative of the visual event that the data in that cluster corresponds to. Generally, RGB frames that are closest to the centroid of the cluster are considered to be better examples of the in-game event that the cluster represents. It may be that a larger number of RGB or YUV frames fall beyond the top-10% in terms of distance to their respective clusters, and so are not used when training the machine video machine learning model.

The clusters for each different type of audio event may be filtered in a similar manner. In some examples, 25% of the audio frames in each cluster are randomly sampled and used to create a corresponding audio file of all the sampled audio frames in that cluster. The audio file may be built 960 ms chunks at a time, for example.

It will be appreciated that 10% and 25% above are non-limiting examples.

The step of clustering the RGB or YUV video frames and audio frames may also involve generating model files to enable the feature representations in each cluster to be labelled.

Returning to FIG. 6, the training method further comprises a step S608 of manually labelling each cluster (for a given signal) with a label indicating an event associated with that cluster. Here, manually labelling means that e.g. a data scientist or developer must provide an input to indicate a label that is to be given each cluster. This may involve reviewing at least some of the frames in each cluster and determining an event that the frames in that cluster correspond to.

For the video frames, it may be that e.g. 50 RGB frames in each cluster need to be reviewed, before all of the RGB frames in that cluster can be identified as corresponding to a particular in-game event. For example, it may be possible to determine that a cluster corresponds to e.g. 'gameplay' based on a review of the video content for that cluster. By labelling the cluster as corresponding to 'gameplay', all of the frames (or feature representations of the frames) be identified as corresponding to 'gameplay'. As will be appreciated, labelling frames in this way is considerably quicker than having to go through thousands, or even hundreds of thousands of frames and manually labelling each frame with a corresponding label.

For the audio frames, it may be desirable to also display the corresponding video, when determining a label for the audio clusters, so that the developer or data scientist can see (as well as hear) what the audio in each cluster represents. This may involve identifying different sections of the video that each audio cluster corresponds to, and determining a label for each audio cluster based on the video clips associated with that cluster. For example, it may be that e.g. 0 to 3 minutes of a given video is identified as pertaining to audio cluster-15, 3 to 4 minutes pertaining to audio cluster-2, 4 to 7 minutes pertaining to audio cluster-15 (and so on and so forth). A label for e.g. cluster-15 may then be determined by viewing a portion of the video output between 0 to 3 minutes and 4 to 7 minutes, along with the corresponding audio.

It has been found by the inventors that using this method a sufficient amount of labelled training data can be obtained in 1-2 hours. For example, for the game Horizon Zero Dawn®, it was found that, for approximately 90 hours of video game footage, the generation of labelled scene-type clusters took approximately 1 hour. It was also found that for approximately 10 hours of audio (from the same game), the generation of clusters labelled as highlights and non-highlights took approximately 1 hour.

Figure 8A:
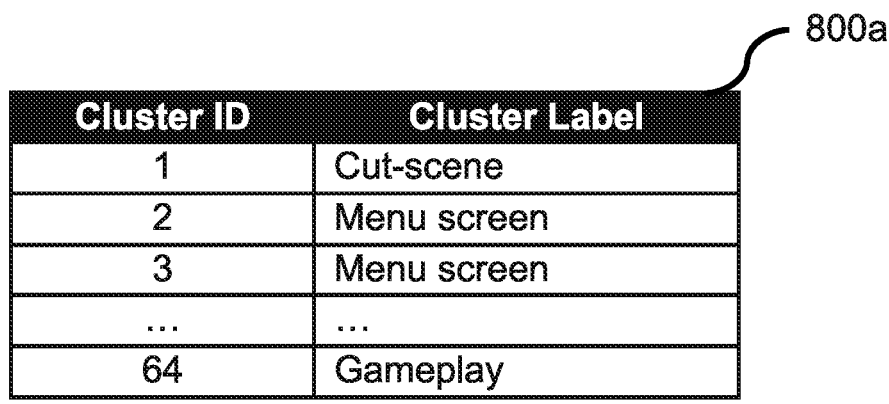
FIG. 8a shows an example of different descriptive labels that may be generated manually for video frame clusters.

FIG. 8a shows an example of descriptive labels that have been given to some of the 64 clusters identified for RGB video frames. In FIG. 8a, a first cluster has been identified as corresponding 'cut-scenes'; the second and third clusters have been identified as corresponding to 'menu screens'; the 64th cluster has been identified as corresponding to 'gameplay'.

In some cases it may be desirable to merge different clusters as corresponding to the same in-game (even if only at a high-level) event. For example, cluster 2 may correspond to a "quests" menu screen and cluster 3 may correspond to e.g. a "crafting" screen. It is unlikely that video frames including either of these screens would be considered a highlight event, and so it may be desirable to merge these clusters into a single cluster by giving them the same descriptive-label. In some examples, some of the clusters may correspond to different types of gameplay (e.g. 'combat', 'exploring', 'swimming', etc.) and it may be desirable to merge these clusters into a single cluster corresponding to 'gameplay'. This may be desirable where, for example, it can be determined from the corresponding audio whether a highlight event has occurred.

Figure 8B:
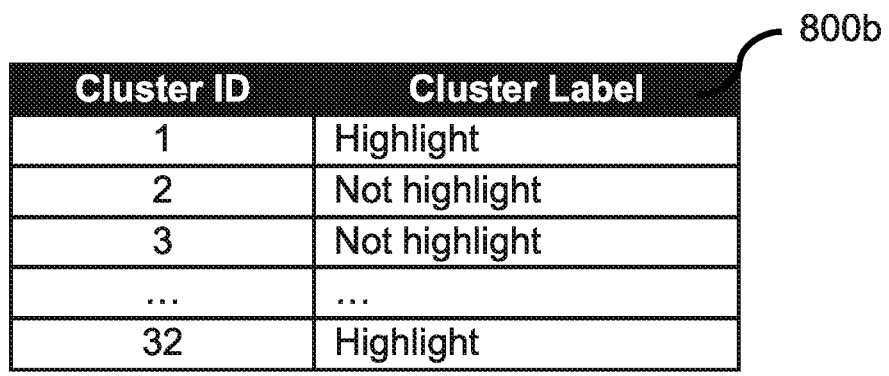
FIG. 8b shows an example of different descriptive labels that may be generated manually for audio frame clusters.

FIG. 8b shows an example of descriptive labels that have been given to some of the 32 clusters identified for the audio frames. In FIG. 8a, clusters 1 and 32 have been identified as corresponding to highlight audio events whilst clusters 2 and 3 have been identified as not corresponding to non-highlight events. Clusters 1 and 32 may correspond to audio that is generated during different types of combat. Clusters 2 and 3 may correspond to e.g. cut-scene dialogue or sounds that are usually present as background noise (e.g. birds singing, rain, etc.).

As described above in relation to FIG. 8a, it may be desirable to manually merge clusters that represent the same high level cluster. For example, rather than identifying different audio clusters as corresponding to specific audio events it may be desirable to merge all audio events corresponding to action/combat together by labelling them as corresponding to a 'highlight'. By labelling the audio clusters in this way, a binary flag (i.e. 1=highlight, 0=non-highlight) is created for each cluster. Thus, training the audio machine learning model with this data becomes a binary classification problem. It has been found by the inventors that an audio model trained in this way is very computationally efficient and does not require a GPU to be run (i.e. it can be done on the CPU).

Returning to FIG. 6, the method comprises a step S610 of inputting the feature representations of each signal and the corresponding labels, into respective machine learning models. The machine learning models are trained using supervised deep learning. The models are said to have been trained using supervised learning because the training data was at least partially generated using unsupervised learning.

The feature representations of the video frames and their corresponding labels may be input to a multi-class classification algorithm (corresponding to the video machine learning model). The video machine learning model may then be trained to determine a relationship between feature representations of RGB or YUV frames and descriptive labels associated with those frames. The video machine learning model may comprise a neural network, such as a convolutional or recurrent neural network, for example. The video machine learning model may be configured to output, for each video frame (or rather representation thereof), predicted probabilities for each of the different corresponding labels. A video frame may be identified as corresponding to a particular event based on the label that is associated with the highest probability.

The feature representations of the audio frames and the corresponding labels may be input to a corresponding audio machine learning model, or a binary classification model such as a Gradient Boosting Trees, Random Forests, Support Vector Machine algorithm, for example.

Each model may be trained in iterative manner. For example, after each epoch (pass through a training set), a final version of the model may be saved if it is determined that model performed better than it did for a previous iteration. In some cases, a given model may be determined as being ready for deployment when it produces sufficiently accurate results for an unseen input set of training data.

In some embodiments, the machine learning models may not be trained with feature representations of the different signals in the previously generated video game data. Rather, once the labels have been determined for the video and audio frames in a given cluster (as described above), it may be that the audio and video frames, along with the corresponding labels, are input to respective machine learning models.

Training the models in this way can be advantageous in that the machine learning models can be trained in a more bespoke manner. For example, generating feature representations using a pre-trained model such as e.g. DenseNet may be inefficient because the pre-trained model will likely have been trained using thousands of images that have no relevance to a particular video game. As a result, the use of such a pre-trained model may be excessive in terms of the memory required to store it and the time taken to execute it (requiring the use of a GPU, for example).

It may therefore be desirable to ensure that DenseNet is not required, once the model has been trained. This may be achieved, for example, by using DenseNet for the purposes of clustering, but then training e.g. a neural network with the video (RGB or YUV) and audio frames and the corresponding labels generated as above. This would then mean that the trained model could take the video and audio frames as inputs, along with the corresponding labels, without the input video and audio frames first having to go through e.g. DenseNet.

While the above has been described primarily in relation to video and audio frames, it will be appreciated that the steps of generating feature representations, clustering the feature representations and manually labelling the clusters may equally be applied to any one of the haptic, telemetry, motion, player input, speech, video camera signals included in the training data. Once the clusters for a given signal have been labelled, the data (or feature representations thereof) may then be input to a corresponding machine learning model.

As an example, for player input signals, this may involve dividing the signals into a plurality of frames and detecting the buttons pressed, and the frequency with which the buttons were pressed, for each frame. The button presses and corresponding frequencies may then be clustered (as above), and correlated with the corresponding video. The different clusters may then be labelled (e.g. 'combat', 'ambling', etc.) and used to train a machine learning model. The machine learning model may be trained to identify, for a given frame of button presses, a corresponding label for that frame.

It will be further appreciated that a computer readable medium having computer executable instructions may be adapted to cause a computer system to perform any of the training method steps described previously.

FIG. 9 shows schematically an example of a system 900 for training the first and second modules 504a, 504b described previously. In FIG. 9, the system is shown for video frames and corresponding audio only. It will be appreciated that the system may also be trained using telemetry data, haptic data, player input data, etc. as described previously. In such cases, there may be a parallel branch in the system for each different signal type, with each branch including corresponding units. The system may be trained with previously generated video game data, which may be generated and collected in any of the manners described previously in relation to FIG. 6.

In FIG. 9, a video file 902 comprising RGB or YUV frames 904a (corresponding to the video signal) and a corresponding audio signal 904b is shown. As described previously, the video game playing device may generate video files of gameplay and it may be necessary to separate the RGB or YUV frames and corresponding audio into separate files (or signals). It may also be necessary to divide the audio signal into audio frames of e.g. 960 ms in duration. A separate unit (not shown) may be provided for this function.

In FIG. 9, the system is shown as comprising a plurality of feature extractors. Each feature extractor is configured to receive a different type of signal and to generate feature representations of the data in those signals.

In FIG. 9, the first feature extractor 906a is shown as being arranged to receive video frames. The first feature extractor 906a is configured to generate feature representations of the received video frames using any of the methods described previously. For example, the first feature extractor 906a may include a pre-trained model (e.g. DenseNet, ResNet, MobileNet, etc.) that receives RGB or YUV video frames as an input and is pre-trained to output a feature representation of those frames.

The second feature extractor 906b is shown as receiving audio frames. The second feature extractor 906b is configured to generate feature representations of the audio frames using any of the method described previously. For example, the second feature extractor 906b may be configured to generate log-mel spectrograms of each of the audio frames in a received audio signal.

The system further comprises a plurality of clustering units. Each clustering unit is configured to receive the feature representations output by a corresponding feature extractor and to use unsupervised learning to sort the received feature representations into a plurality of clusters.

As can be seen in FIG. 9, there is a one-to-one mapping between feature extractors and clustering units—i.e. each clustering unit is configured to receive the feature representations of a different type of signal. The feature representations for each signal may be clustered using k-means or mini-batch k-means clustering as described previously. In FIG. 9, the first clustering unit 908a is shown as receiving the feature representations output by the first feature extractor 906a; the second clustering unit 908b is shown as receiving the feature representations output by the second feature extractor 906b.

The system further comprises a labelling unit operable to generate labels for the clusters output by the clustering unit. In FIG. 9, the system is shown as comprising a plurality of labelling units, one for each clustering unit. Each labelling unit is configured to generate labels for each cluster based on an input received from a user. The labels correspond to descriptive labels indicating an event associated with the feature representations in a respective cluster. The labels may be generated for each of the clusters for a given signal in any of the manners described previously in relation to FIG. 6.

The system further comprises a training unit for training the first and second modules 504a, 504b described previously. The system may comprise a plurality of training units, with each training unit being configured to receive the feature representations and corresponding labels generated for a particular signal type. Each training unit is configured to determine a relationship between the feature representations of the signals and corresponding descriptive labels input to that training unit.

In FIG. 9, the first training unit 912a is configured to receive the feature representations output by the first feature extractor 906a and the corresponding labels output by the first labelling unit 910a, and to determine a relationship between the two. Likewise, the second training unit 912b is configured to receive the feature representations output by the second feature extractor 906b and the corresponding labels output by the second labelling unit 910b, and to determine a relationship between the two. The first training unit 912a may comprise a neural network that is to be trained with feature representations of the video frames and corresponding descriptive labels, as described previously. The second training unit 912b may comprise a logistic regression learning model or a binary classification model that is to be trained with log-mel spectrograms of audio frames and corresponding descriptive labels, as described previously. However, either training unit may employ a suitable machine learning model or system.

The first and second training units 912a, 912b may correspond to one or more servers (forming 'the cloud') on which the first and second modules 504a, 504b are to be trained. The feature representations and corresponding descriptive labels generated by the feature extractors and labelling units may be uploaded to these one or more servers, so that the corresponding modules 504a, 504b installed thereat can be trained.

Once each module 504a, 504b is sufficiently trained by the corresponding training unit it may then be exported to the listening unit 500 described previously in relation to FIG. 5.

It will be appreciated that, in embodiments where the previously generated video game data includes at least one of haptic data, telemetry data, player input data, the system may include a feature extractor, clustering unit, labelling unit and training unit for handling each of these different types of data. As described previously, it may not be necessary to train a machine learning module with telemetry data, since this will usually provide an explicit indication of an in-game event. However, it will generally be expected that a feature extractor, clustering unit, labelling unit and training unit will be needed for player input data.

It will be appreciated that the method of generating a recording of video game gameplay described herein with reference to a plurality of machine learning models may be combined with the method of training set of machine learning models, also as described herein, for example to monitor the output of a system during training by a developer, or to refine a partially trained set of machine learning models to respond to an individual's game play style (for example, if a player is a sniper rather than a melee-style player, they may accumulate different balances of events, and optionally this can result in one or more clusters being created, modified or split within the training method to refine one or more models). Similarly, optionally whilst a plurality of machine learning models (e.g. video and audio) are trained such that they operate as described herein, one or more additional models may be trained in parallel with the process of generating recordings of video game gameplay for the end user; for example, a model based upon user inputs and/or responses to game play may be trained or re-trained/refined in response to the particular inputs and/or responses of the end user.

Hence any suitable combination of two or more trained machine learning models and a (re)training regime for those models or additional models may be implemented as a combined method.

It will be appreciated that the method(s) described herein may be carried out on conventional hardware suitably adapted as applicable by software instruction or by the inclusion or substitution of dedicated hardware. Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of generating a recording of video game gameplay, the method comprising:
    receiving video game data generated during the playing of a video game, the video game data comprising at least a video signal and corresponding audio signal, each signal comprising a plurality of frames, wherein the video game data further comprises a player input signal indicating player inputs received at one or more devices being used to play the video game;
    receiving at each of a first, a second and a third module, a respective one of the video signal, the audio signal, and the player input signal included in the received video game data and determining, using a trained model, an event occurring within the video game based on only the respective one of the video signal, the audio signal, and the player input signal input to that module;
    detecting that one or more highlight events have occurred during the playing of the video game when an output of each of the first, second and third modules indicates an event occurring between two frames of the plurality of frames; and
    generating a recording of the video game gameplay based on the detecting, the recording including at least some of the video frames and/or the audio frames in the video game data that correspond to the one or more highlight events of the detecting step;
    receiving, at each of a plurality of feature extractors: (i) a respective one of the video signal and the audio signal in the received video game data and to generate feature representations of the frames in such respective one of the video signal and the audio signal, and (ii) previously generated video game data, each feature extractor being configured to receive a different signal in the previously generated video game data, where at least the first and second modules that receive the video signal and the audio signal, respectively, receive the feature representations generated for a respective one of the video signal and the audio signal;
    receiving, at each of a plurality of clustering units, the feature representations output by a different feature extractor and to use unsupervised learning to sort the received feature representations into a plurality of clusters;
    generating labels for the clusters output by each clustering unit, the generating labels including generating the labels based on an input from a user, each label indicating an event associated with the frames or corresponding feature representations in a respective cluster; and
    training at least the first and second modules, the training including determining a relationship between the frames or feature representations input to the first and second modules and the corresponding labels generated by the labelling unit,
    wherein each clustering unit comprises a k-means or mini-batch k-means clustering algorithm configured to sort the feature representations into different respective clusters.

2. A method according to claim 1, wherein each machine learning model is trained using previously generated video game data generated during a previous playing of the video game, and each machine learning model is trained using semi-supervised learning to determine a relationship between one of the video signal and the audio signal input to that model and corresponding events.

3. A method according to claim 1, wherein the video game data further comprises one or more of:
   i. a haptic signal indicating haptic feedback output at one or more devices being used to play the video game;
   ii. a motion signal indicating motion of the player;
   iii. a speech signal comprising the player's speech;
   iv. a video camera signal comprising a video recording of the player; and
   v. a telemetry signal indicating an in-game event, where the method further comprises determining whether a highlight event has occurred based on an output of each machine learning model and received telemetry signal.

4. A method according to claim 1, comprising inputting at least some of the frames of the video signal into a video machine learning model among the plurality of machine learning models; and
   wherein the video machine learning model is trained to identify a type of scene to which each of the at least some frames of the video signal correspond.

5. A method according to claim 4, wherein the video machine learning model comprises a neural network.

6. A method according to claim 1, comprising inputting at least some of the audio frames of the audio signal into an audio machine learning model among the plurality of machine learning models; wherein the audio machine learning model is trained to identify an audio event to which each of the at least some frames of the audio signal correspond.

7. A method according to claim 6, comprising:
   inputting at least some of the frames of the video signal into a video machine learning model among the plurality of machine learning models, wherein the video machine learning model is trained to identify a type of scene to which each of the at least some frames of the video signal correspond;
   generating respective feature representations of the at least some of the frames of the video signal and the at least some of the frames of the audio signal; and
   wherein the inputting the at least some of the frames of the video signal, and the inputting the at least some of the audio frames of the audio signal into, respectively, into the video machine learning model and the audio machine learning model comprises inputting the respective feature representations into the respective video machine learning model and the audio machine learning model.

8. A method according to claim 7, wherein generating the feature representations of the video signal comprises inputting at least some of the frames of the video signal into a pre-trained model.

9. A method according to claim 7, wherein generating the feature representations of the audio signal comprises generating a mel-spectrogram of at least some of the frames of the audio signal.

10. A method according to claim 6, wherein the audio machine learning model comprises a logistic regression model or a binary classification model.

11. A method according to claim 1, wherein each trained one of the machine learning models is executed locally at a computing device being used to play the video game.

12. A method according to claim 1, comprising:
   receiving historical data generating during the playing of the video game by one or more other players;
   determining a correspondence between at least some of the historical data and the at least some of the frames of the video signal and/or the audio signal selected; and
   displaying the historical data that corresponds with the at least some of the frames of the video signal and/or the audio signal selected, when playing back the recording of video game gameplay.

13. A non-transitory, computer readable medium having computer executable instructions stored thereon, which when executed by a computer, cause the computer system to generate a recording of video game gameplay, by carrying out actions, comprising:
   receiving video game data generated during the playing of a video game, the video game data comprising at least a video signal and corresponding audio signal, each signal comprising a plurality of frames, wherein the video game data further comprises a player input signal indicating player inputs received at one or more devices being used to play the video game;
   receiving at each of a first, a second and a third module, a respective one of the video signal, the audio signal, and the player input signal included in the received video game data and determining, using a trained model, an event occurring within the video game based on only the respective one of the video signal, the audio signal, and the player input signal input to that module;
   detecting that one or more highlight events have occurred during the playing of the video game when an output of each of the first, second and third modules indicates an event occurring between two frames of the plurality of frames; and
   generating a recording of the video game gameplay based on the detecting, the recording including at least some of the video frames and/or the audio frames in the video game data that correspond to the one or more highlight events of the detecting step;
   receiving, at each of a plurality of feature extractors: (i) a respective one of the video signal and the audio signal in the received video game data and to generate feature representations of the frames in such respective one of the video signal and the audio signal, and (ii) previously generated video game data, each feature extractor being configured to receive a different signal in the previously generated video game data, where at least the first and second modules that receive the video signal and the audio signal, respectively, receive the feature representations generated for a respective one of the video signal and the audio signal;
   receiving, at each of a plurality of clustering units, the feature representations output by a different feature extractor and to use unsupervised learning to sort the received feature representations into a plurality of clusters;
   generating labels for the clusters output by each clustering unit, the generating labels including generating the labels based on an input from a user, each label indicating an event associated with the frames or corresponding feature representations in a respective cluster; and
   training at least the first and second modules, the training including determining a relationship between the frames or feature representations input to the first and second modules and the corresponding labels generated by the labelling unit, wherein each clustering unit comprises a k-means or mini-batch k-means clustering algorithm configured to sort the feature representations into different respective clusters.

14. A system for generating a recording of video game gameplay, the system comprising:
- a receiving unit configured to receive video game data generated during the playing of a video game, the video game data comprising at least a video signal and corresponding audio signal, each signal comprising a plurality of frames, wherein the video game data further comprises a player input signal indicating player inputs received at one or more devices being used to play the video game;
- a first, second and third module, each module being configured to receive a respective one of the video signal, the audio signal, and the player input signal included in the video game data and to determine, using a trained model, an event occurring within the video game based on only the respective one of the video signal, the audio signal, and the player input signal input to that module;
- a highlight detector configured to detect that a highlight event has occurred during the playing of the video game when an output of each of the first, second and third modules indicates an event occurring between two frames of the plurality of frames;
- a recording unit configured to generate a recording of the video game gameplay based on an output of the highlight detector, the recording including at least some of the video and or audio frames in the video game data that corresponds to the one or more detected highlight events;
- a plurality of feature extractors, each feature extractor being configured to: (i) receive a respective one of the video signal and the audio signal in the received video game data and to generate feature representations of the frames in such respective one of the video signal and the audio signal, and (ii) receive previously generated video game data, each feature extractor being configured to receive a different signal in the previously generated video game data, where at least the first and second modules that receive the video signal and the audio signal, respectively, are configured to receive the feature representations generated for a respective one of the video signal and the audio signal;
- a plurality of clustering units, each clustering unit being configured to receive the feature representations output by a different feature extractor and to use unsupervised learning to sort the received feature representations into a plurality of clusters;
- a labelling unit operable to generate labels for the clusters output by each clustering unit, the labelling unit being configured to generate the labels based on an input from a user, each label indicating an event associated with the frames or corresponding feature representations in a respective cluster; and
- a training unit configured to train at least the first and second modules, the training unit being configured to determine a relationship between the frames or feature representations input to the first and second modules and the corresponding labels generated by the labelling unit,
- wherein each clustering unit comprises a k-means or mini-batch k-means clustering algorithm configured to sort the feature representations into different respective clusters.

15. A system according to claim 14, wherein at least the first and second modules that receive the video signal and the audio signal, respectively, are trained using semi-supervised learning so as to determine a relationship between the respective one of the video signal and the audio signal input to that model and corresponding events.

16. A system according to claim 14, wherein
the video game data further comprises a telemetry signal indicating in-game events; and
wherein the highlight detector is configured to determine an event occurring within the video game based on an output of the first, second, and third modules and a received telemetry signal.

17. A system according to 14, wherein a first feature extractor is configured to receive video frames and a second feature extractor is configured to receive audio frames; and
wherein the first module is configured to receive feature representations of video frames and the second module is configured to receive feature representations of audio frames.

* * * * *